June 25, 1929.  D. T. WILLIAMS  1,718,326
LOCOMOTIVE EQUALIZER
Filed Dec. 14, 1927
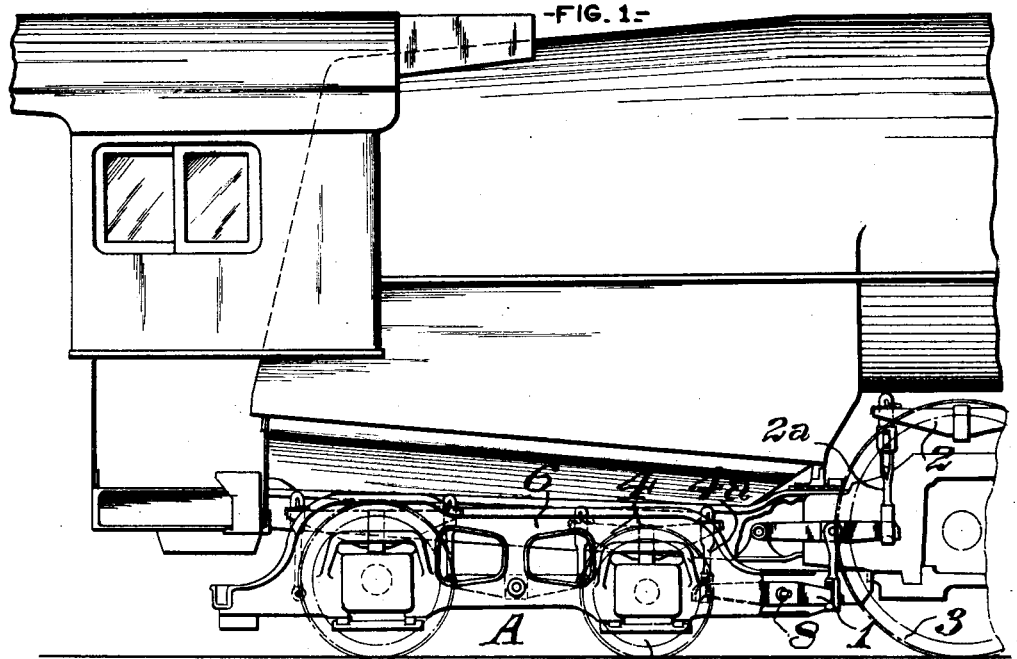
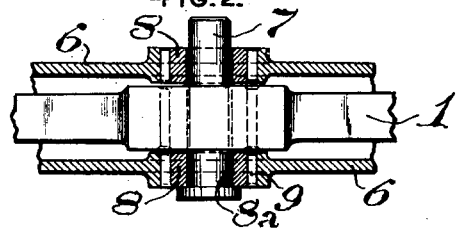
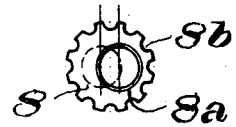
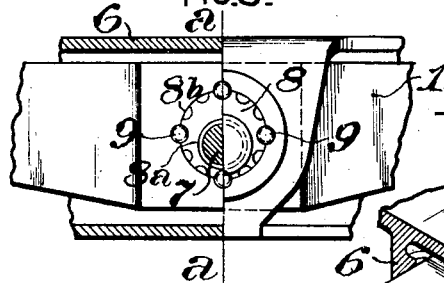
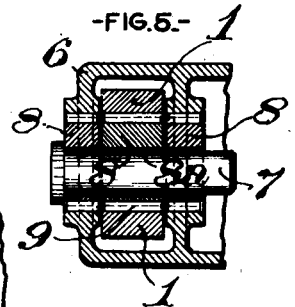
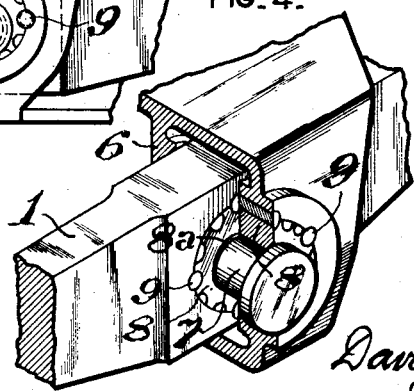
WITNESSES  INVENTOR Patented June 25, 1929.

1,718,326

UNITED STATES PATENT OFFICE.

DAVID T. WILLIAMS, OF PATERSON, NEW JERSEY.

LOCOMOTIVE EQUALIZER.

Application filed December 14, 1927. Serial No. 239,894.

This invention relates, generally, to locomotive equalizers and more particularly to the levers forming part of such equalizers. Its object is to provide an appliance, of simple and inexpensive construction and ready applicability in standard practice, whereby a change in the lengths of the respective arms of the equalizer levers may be speedily and conveniently effected.

In the present embodiment of the invention as illustrated in the drawings, a construction is shown whereby an increase or decrease, as may be desired, of the proportionate relation of the weight borne by the truck to that sustained by the spring suspension system of the driving wheels, may be speedily and conveniently effected.

The improvement claimed is hereinafter fully set forth.

In the accompanying drawing: Figure 1 is a side view, in elevation, of the rear portion of a locomotive engine, illustrating an application of the invention; Fig. 2, a partial horizontal section, on an enlarged scale, through one of the side frames of the trailing truck, showing a plan view of an equalizer; Fig. 3, a view, half in vertical section, through a side frame and an equalizer fulcrum pin, and half in side elevation; Fig. 4, a similarly disposed view, in perspective; Fig. 5, a vertical transverse section, on the line $a\ a$ of Fig. 3; and, Fig. 6, a side view, in elevation, of an adjusting block.

The length of equalizers of two wheeled locomotive trailing trucks of the various standard designs, is sufficiently great to admit of forming a plurality of longitudinally spaced holes, through any one of which an equalizer fulcrum pin may be passed, in order to change the location of the pin, relatively to the end connections of the equalizer when it is desired to vary the relative proportions of the weight of the locomotive sustained on the spring arrangement thereof and the rear driving wheels.

The four wheeled trailing trucks which have recently been extensively adopted, afford an excellent opportunity for the utilization of the present invention. The equalizers have, under the necessary conditions of the design, been material shortened, and, consequently, a much smaller change in the location of the fulcrum pin effects, to a much greater extent, the transfer of weight from the truck to the spring suspension, and vice versa. It has been found that the required variation of the fulcrum pin axis is so comparatively slight, that it is not practicable to provide a plurality of fulcrum pin holes in the short equalizers as were formed in the long equalizers of the two wheeled trucks, for the reason that the holes would overlap each other.

The present invention relates to means for effecting a much finer adjustment of the fulcrum pin by the provision of insertible and removable adjusting blocks, which are fitted eccentrically on the fulcrum pins, and secured in adjusted position by suitable keys.

In the practice of the invention, referring descriptively to the specific embodiment thereof which is herein exemplified as applied in connection with a four wheeled locomotive trailing truck, which is indicated, as an entirety, by A, the forward ends of the equalizers, 1, are, as heretofore, connected, through an intermediate linkage, to the adjacent hangers, $2^a$, of the springs, 2, of the rear pair of driving wheels, 3. The rear ends of the equalizers are connected to the forward hangers, $4^a$, of the springs, 4, of the forward pair of trailing truck wheels, 5.

The equalizers are, as in prior practice, pivotally connected to the side frame members, 6, of the truck, by fulcrum pins, 7, on which they are journalled, and which are fixed in the side frames. In order, in accordance with the invention, to vary the relation of the fulcrum pin axes to the equalizers, and thereby to vary the lever arms of the equalizers, and correspondingly vary the distribution of weight between the truck and the driving wheel spring suspension, cylindrical adjusting blocks, 8, are fitted in each of the equalizers, and in the adjoining members of the truck frames, said blocks being bored eccentrically to fit on case hardened bushings, $8^a$, which are, in the turn, bored to fit on the fulcrum pins, 7, and are interposed between said pins and the bearing blocks, to prevent excessive wear of the pins.

The peripheries of the bearing blocks, 8, have, formed in them, a plurality of segmental recesses, $8^b$, as shown in Figs. 3 and 6, for the reception of cylindrical keys, 9, by which they are respectively secured to the equalizers and to the truck frame, and which, after the desired position has been determined, are riveted over to prevent further movement, the bores in the equalizers and truck frame housing the blocks, 8, being recessed, as shown, to cooperate with the oppositely disposed recesses in the blocks and truck frame, after adjustment, for the reception of a portion of the cylindrical keys 9. The open ends of the recesses, which are not occupied by keys, may also be welded to the equalizers, if it is determined that no further graduation will be necessary.

In effecting desired adjustments of the fulcrum pins, relatively to the equalizers, the cylindrical adjusting blocks, 8, are turned in the concentric bores of the equalizers in which they are fitted, until, by means of the eccentricity of their fulcrum pin bores, the fulcrum pins are moved to the positions in which the required proportion of the lever arms of the equalizers, are properly adjusted to the relative lengths by which the required distribution of weight will be effected. The adjusting blocks are then secured in adjusted positions by welding the keys, 9, to them, and to the equalizers. It will be obvious that this adjustment may be readily effected, and made to as fine a degree as may be determined to be necessary. It will be seen that a suitable adjustment of the block, 8, fitted in a lever, will vary the length of the arms of the lever effecting a shortening of either arm and a corresponding lengthening of the other at will. Such adjustment will, however, slightly displace the lever bodily in a longitudinal direction, and to effect a replacement or correction of this, the blocks, 8, fitted in the frame, are rotated in a suitable direction, whereby the fulcrum pin will be moved bodily, and with it the lever to return the latter to its original and normal position without affecting the arm adjustment.

What is claimed as the invention and desired to be secured by Letters Patent is:

1. In a locomotive, the combination, with a truck frame, of an equalizer lever for transmitting weight between said frame and a driving wheel system; a fulcrum pin, coupling said equalizing lever to the truck frame; and cylindrical adjusting blocks, fitted concentrically and adjustably in the truck frame, and fitted eccentrically on the fulcrum pin.

2. In a locomotive, the combination, with a truck frame, of an equalizing lever for transmitting weight between said frame and a driving wheel system; a fulcrum pin, coupling said equalizing lever to the truck frame; cylindrical adjusting blocks, fitted concentrically in the truck frame and fitted eccentrically on the fulcrum pin; and means for connecting said adjusting blocks, detachably, to the truck frame.

3. In a locomotive, the combination, with a truck frame, of an equalizing lever for transmitting weight between said frame and a driving wheel system; a fulcrum pin, coupling said equalizing lever to the truck frame; cylindrical adjusting blocks, fitted concentrically in the truck frame, and fitted eccentrically on the fulcrum pin; and keys, engaging the peripheries of the adjusting blocks and the truck frame, and securing said blocks, detachably, therein.

4. In a locomotive, the combination of an equalizing lever for transmitting weight; a support therefor; a fulcrum pin coupling said equalizing lever to the support; and a cylindrical adjusting means fitted in the lever eccentrically on the fulcrum pin.

5. In a locomotive, the combination of an equalizing lever for transmitting weight; a support therefor; a fulcrum pin coupling said equalizing lever to the support; a cylindrical adjusting means fitted in the lever eccentrically on the fulcrum pin; and means for securing the adjusting means against rotation when the adjustment has been effected.

6. In a locomotive, the combination of an equalizing lever for transmitting weight; a support therefor; a fulcrum pin coupling said lever to the support; a cylindrical adjusting block fitted in the lever eccentrically on the fulcrum pin; and cylindrical adjusting means fitted in the support eccentrically on the fulcrum pin.

7. In a locomotive, the combination of an equalizing lever for transmitting weight; a support therefor; a fulcrum pin coupling said lever to the support; a cylindrical adjusting block fitted in the lever eccentrically on the fulcrum pin; cylindrical adjusting means fitted in the support eccentrically on the fulcrum pin; and means for securing the adjusting block and means against rotation when the adjustments have been effected.

8. In a locomotive, the combination of an equalizing lever for transmitting weight; a support therefor; a fulcrum pin carried by the support coupling said lever between its ends to the support; and a cylindrical adjusting block fitted in said support on said pin to be rotated to vary the lengths of the lever arms.

9. In a locomotive, the combination of an equalizing lever for transmitting weight; a support therefor; a fulcrum pin coupling said lever to the support; a cylindrical adjusting block fitted in the lever eccentrically on the fulcrum pin; cylindrical adjusting blocks, one at each side of the lever fitted in the support eccentrically on the fulcrum pin, and means for securing the adjusting blocks against rotation when the adjustments have been effected.

10. In a locomotive, the combination of an equalizing lever for transmitting weight; a support therefor; means for fulcruming the lever to the support; a cylindrical adjusting block in said lever for changing the lengths of the effective lever arms, whereby the lever is bodily displaced, and means for replacing the lever to original position.

DAVID T. WILLIAMS.